(12) United States Patent
Skuro

(10) Patent No.: US 7,878,648 B2
(45) Date of Patent: Feb. 1, 2011

(54) STRAP LENGTHENING ARRANGEMENT FOR A RETRACTABLE EYEWEAR RETAINING STRAP

(76) Inventor: John Michael Skuro, 2033 Lone Pine Rd., Virginia Beach, VA (US) 23451

( * ) Notice: Subject to any disclaimer, the term of this patent is extended or adjusted under 35 U.S.C. 154(b) by 0 days.

(21) Appl. No.: 12/386,432

(22) Filed: Apr. 17, 2009

(65) Prior Publication Data

US 2010/0007845 A1 Jan. 14, 2010

Related U.S. Application Data

(60) Provisional application No. 61/124,458, filed on Apr. 17, 2008.

(51) Int. Cl.
*G02C 3/00* (2006.01)
(52) U.S. Cl. .................................................... 351/156
(58) Field of Classification Search ................. 351/111, 351/156–158
See application file for complete search history.

(56) References Cited

U.S. PATENT DOCUMENTS

| 6,843,562 | B1 * | 1/2005 | Ng ............................. 351/118 |
| 7,344,243 | B2 * | 3/2008 | Skuro ......................... 351/156 |
| 2006/0114408 | A1 * | 6/2006 | Skuro ......................... 351/156 |

* cited by examiner

*Primary Examiner*—Huy K Mai
(74) *Attorney, Agent, or Firm*—John M. Brandt

(57) ABSTRACT

A strap lengthening arrangement for eyewear incorporating an extendable and retractable retaining strap in a hollow temple to form a part of and be attached to eyewear such as eye sight correction glasses, sunglasses, safety and protection goggles, and the like. The temple has a longitudinal passageway extending the length of the temple and an eyewear retaining strap, a moveable or traveling strap retaining block, and a block retractor are disposed within and along the length of the temple. The strap is arranged to fold back on itself first about a pivot positioned proximate the end of the temple and then again about a second pivot attached to or made part of the block effectively tripling the length of the strap within the temple. An improved block retractor and lock and release mechanism for the block are also disclosed.

8 Claims, 4 Drawing Sheets

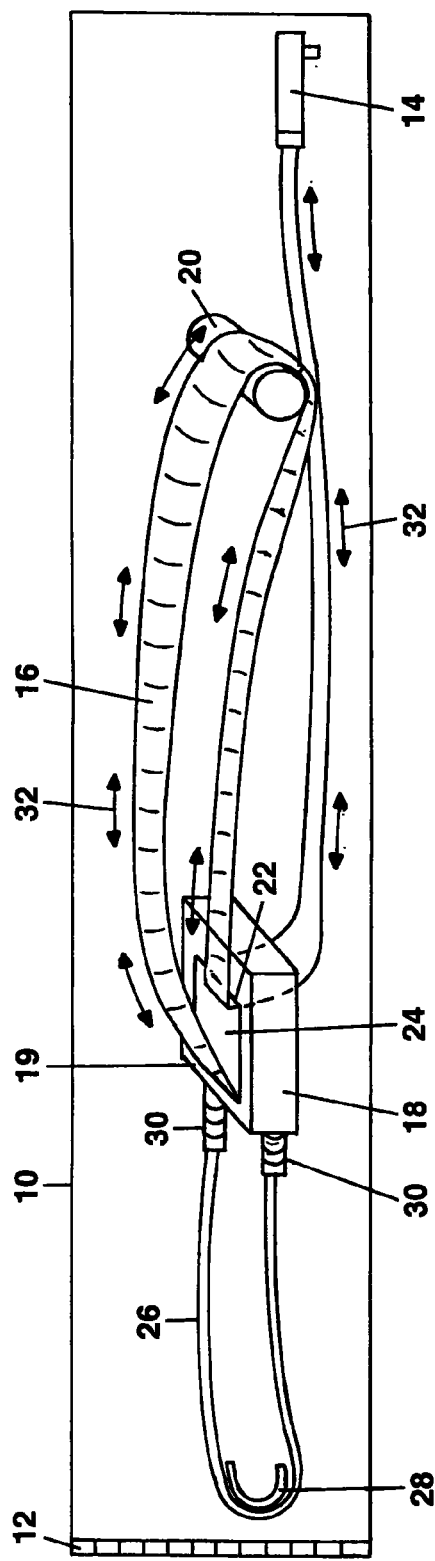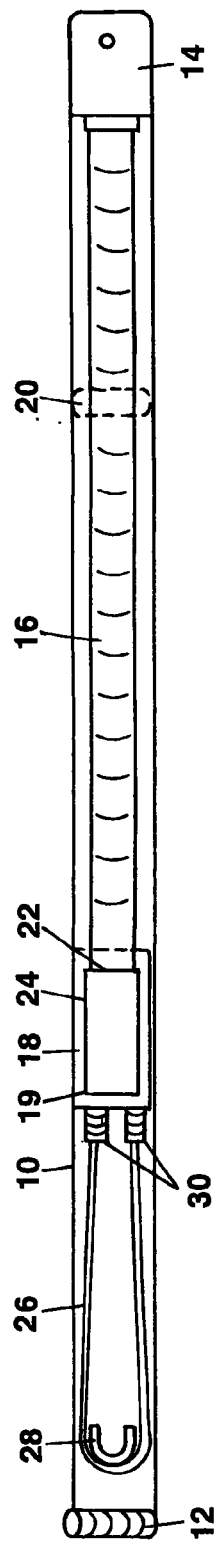

STRAP LENGTHENING ARRANGEMENT FOR A RETRACTABLE EYEWEAR RETAINING STRAP

CROSS REFERENCE TO RELATED APPLICATIONS

This application is based on the disclosure of Provisional Application Ser. No. 61/124,458, filed Apr. 17, 2008, which is hereby incorporated by reference.

BACKGROUND OF THE INVENTION

1. Field of the Invention

The invention relates to devices for securing eyewear to the body of a wearer and more particularly relates to strap retracting arrangements and retaining straps disposed in eyewear temples for holding eyewear in place about the head or neck.

2. Description of the Prior Art

Retaining straps for eyewear or eyeglasses are well known in the prior art. Simple string type retainers having loops at each end to engage eyewear temples are readily available. These devices are usually inelastic and are designed to allow the eyewear to be worn about the neck when removed from the head. Elastic retainers are also sold for use in sports activities to keep the eyewear securely attached to the head. Both of the prior art types of elastic and inelastic retainers are separate units which remain external to the eyewear.

U.S. Pat. No. 4,479,703, Enghofer, discloses a retaining assembly wherein the retaining straps are elastic and retract of there own elasticity into hollow temples. U.S. Pat. No. 6,547,388, Bohn, provides a similar device wherein the retaining strap coils about itself and is adjustable as to effective length by various stop mechanisms.

U.S. Pat. No. 6,905,206, Skuro, provides a retractable assembly for both elastic and inelastic straps so that both an active mode, i.e., secured to the head, and passive mode, for example, around the neck, are available. Additionally, the design allows the straps to be completely retracted when neither form of use is desired. Other patents issued to the same inventor illustrating novel arrangements relating to this same field are U.S. Pat. Nos. 7,159,978; 7,344,243; and 7,399,079.

The present invention improves upon the prior art by providing means to effectively triple the length of the strap disposed within the temple, increase the force of the block retractor, and lock and unlock the strap retaining block to allow sliding motion within the temple.

SUMMARY OF THE INVENTION

The invention may be summarized as an assembly for increasing the length of an extendable and retractable retaining strap that can be accommodated within the temple of head worn eyewear. By eyewear is meant any framelike device which contains, holds, or supports transparent, clear, colored, and/or corrective lens structures, which frame is supported on the head by the use of temples that fit over the ears. Items such as sunglasses, sight correcting eyeglasses, and safety glasses are all included in the class of eyewear for which the invention is appropriate.

This is accomplished by providing a mechanical arrangement in which the strap folds back on itself about a pair of pivots within the temple. One end of the strap is affixed to a moveable strap retaining block and the opposite end to a connector which connector allows the strap to be secured to an opposing temple or similar extendable strap after passing about the head or neck of the wearer. A pivot is disposed across the inside of the temple near the temple end from which the strap is withdrawn about which pivot the strap is wrapped and then returned to the block passing through a second pivot, an aperture in the block for example, thereafter again being directed toward the end of the temple furthest from the eyewear frame from where it may be extended outside the temple.

The assembly further includes an improved retractor comprising a length of natural or synthetic rubber extending from the block toward the eyewear frame where it is wrapped around a bearing and returned to the block. An improved combination of bearing and retractor attachment means to the block is shown in detail.

Additionally, an improved lock and release mechanism for the block at the location of furthest travel within the temple is disclosed. An extension of the block in the form of a tail is arranged to fall into an aperture on one side of the temple at the end of the strap withdrawal operation. The block is released to allow retraction of the strap by pivoting or rocking the block and thereby the extension out of the aperture by applying pressure to the block through the temple at an appropriate position.

These, and other features and advantages of the invention will become more evident from the description of the preferred embodiment accompanied by the drawings which follows.

DESCRIPTION OF THE DRAWINGS

FIG. 1 is a diagrammatic perspective view of the preferred embodiment of the invention;

FIG. 2 is a cross-sectional side view of the embodiment of FIG. 1;

DESCRIPTION OF THE PREFERRED EMBODIMENT

Figure 3:
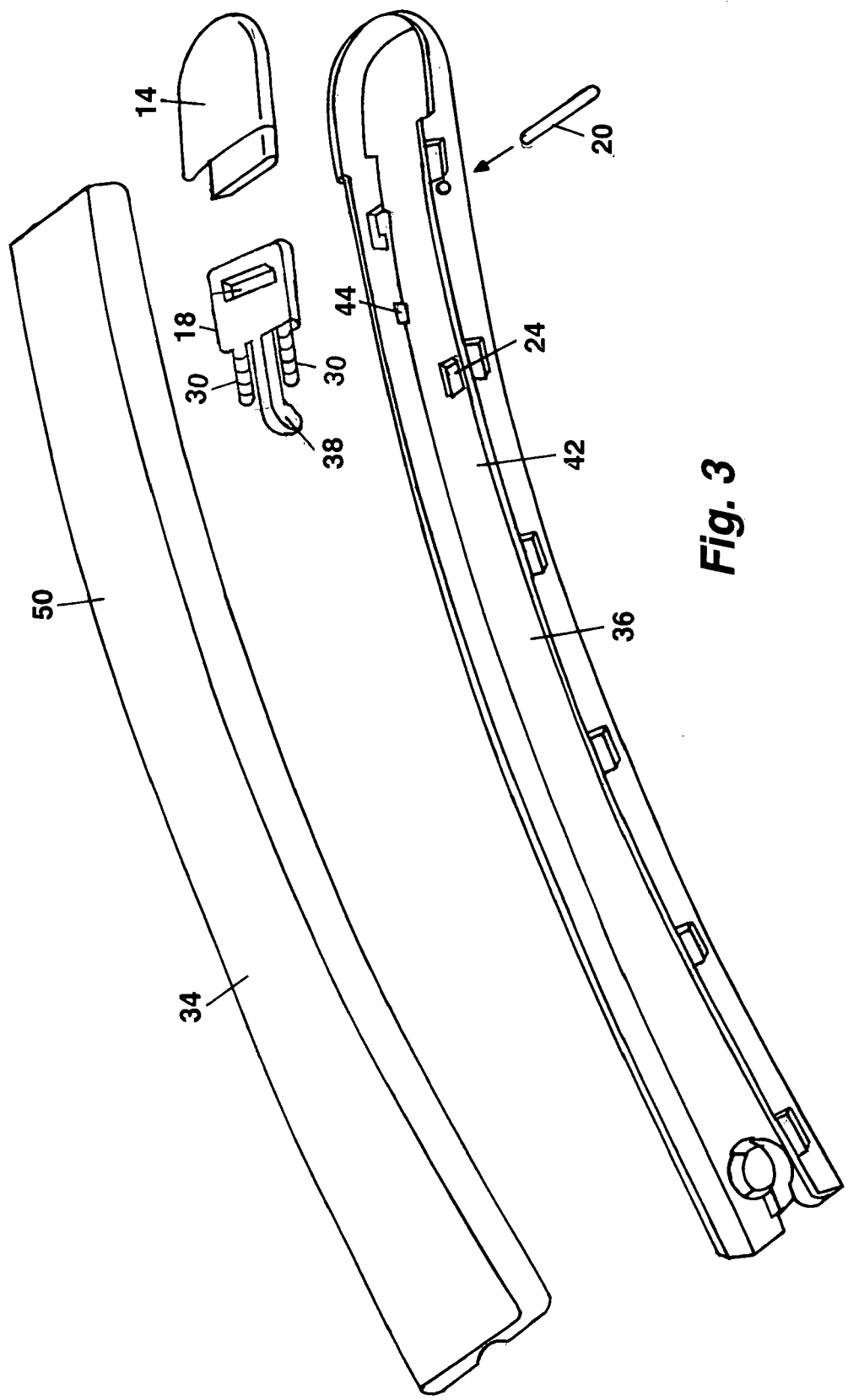
FIG. 3 is a broken-out perspective view of the preferred embodiment of the invention.
Figure 4:
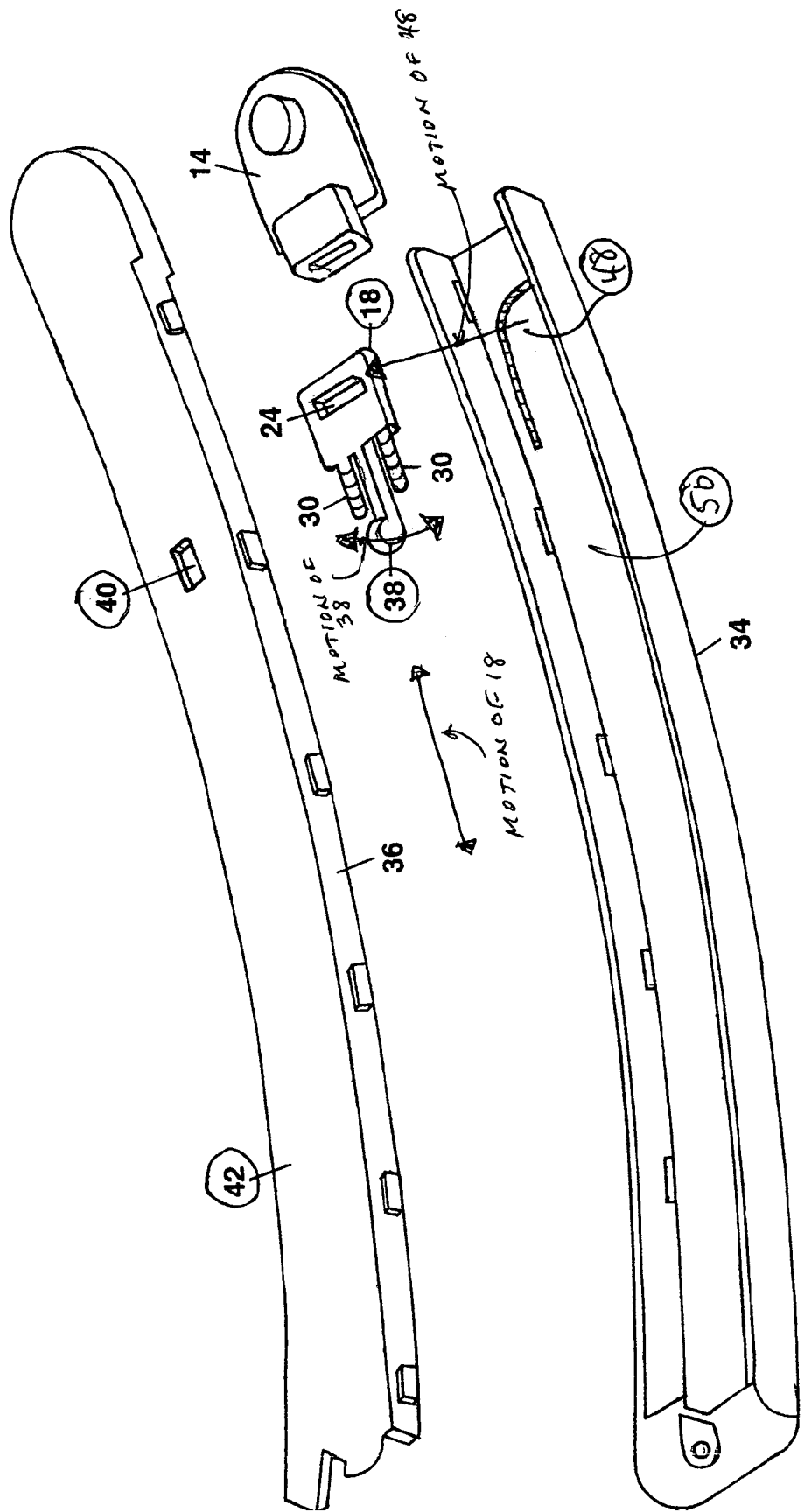
FIG. 4 is an additional perspective view showing the opposite side of that of FIG. 3.

Referring first to FIG. 1, a diagrammatic perspective view of the preferred embodiment of the invention is illustrated in which the component parts of the strap lengthening assembly are disposed within a hollow temple 10 shown schematically. Hinge 12 at one end of temple 10 is arranged to connect to an eyewear frame, not shown, and strap connector 14 at the opposite end secures the retaining strap, once withdrawn, to an opposing strap connector or temple end.

Strap 16 is fixed at one end 19 to strap retaining block 18 which is arranged to slide back and forth within temple 10. Strap reversing pivot 20 is disposed within the temple near the end 21 from which the strap is withdrawn. As shown, it may consist of a rotateable bar. An additional strap-reversing pivot 22 is located at block 18 and may be in the form of one side of an aperture 24 or a separate pivot such as an additional rotateable bar disposed on the interior or exterior of the block.

Strap retaining block 18 is biased toward the eye frame end of the temple by block retractor 26, a length or strand of natural or synthetic rubber disposed about bearing or retractor guide 28 for example. Such rubber should have an elasticity of at least 500 percent and memory retention of between 90 and 100 percent. Suitable material, either in solid or tubular form is available from Kent Elastomer Products, Kent, Ohio.

The employment of tubular material for retractor 26 facilitates connection to block 18 by the use of a pair of barbed extensions 30. The inside diameter of the tubing and the outside diameter and configuration of the barbs are arranged such that upon insertion of the ends of retractor 26 into barbs 30, a bond of sufficient strength will be formed to prevent retractor 26 from breaking away from block 18 upon movement of the block during withdrawal of the strap. Additionally, a suitable adhesive may be employed to secure the connection between block 18 and retractor 26.

As is shown by arrows 32, strap 16 will move about pivots 20 and 22 back and forth, shortening and lengthening, into and out of temple 10 as connector 14 is withdrawn and released, the motivating power for retracting the strap into the temple being provided by retractor 26.

FIGS. 3-6 illustrate a lock and release mechanism which is particularly suitable for securing strap 16 in a withdrawn state against the counterforce of retractor 26 as well as releasing the strap for reentry into the temple. Temple 10 is formed of two mating halves 34 and 36 into which are inserted block 18, connector 14, and the retaining strap, not shown, positioned between the two in the arrangement detailed in FIG. 1.

Figure 5:
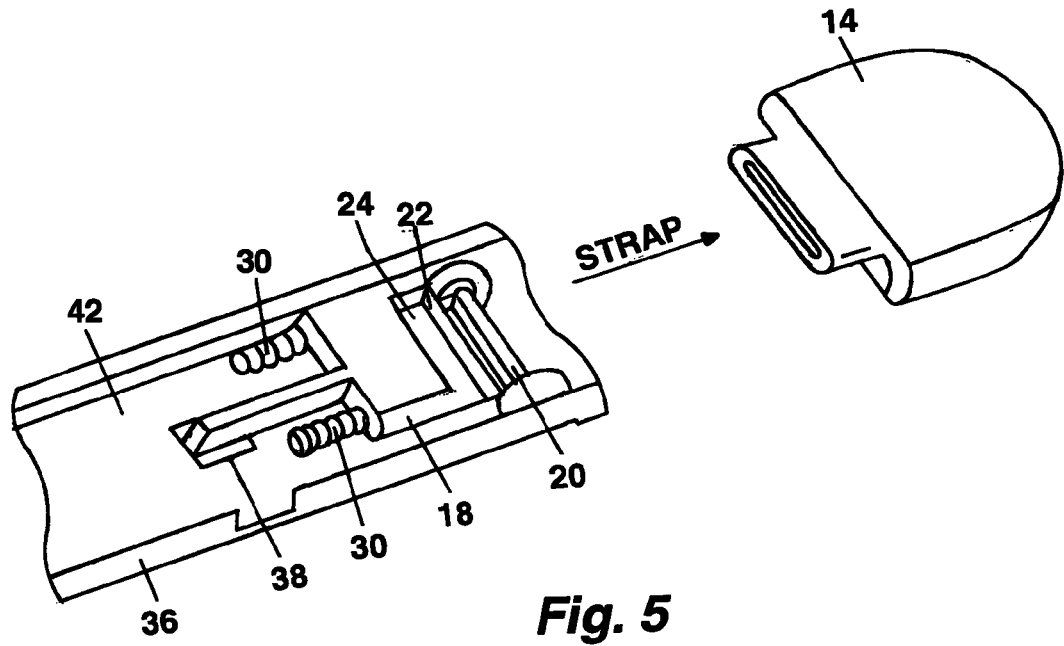
FIG. 5 is a detailed perspective view of a portion of FIG. 3.
Figure 6:
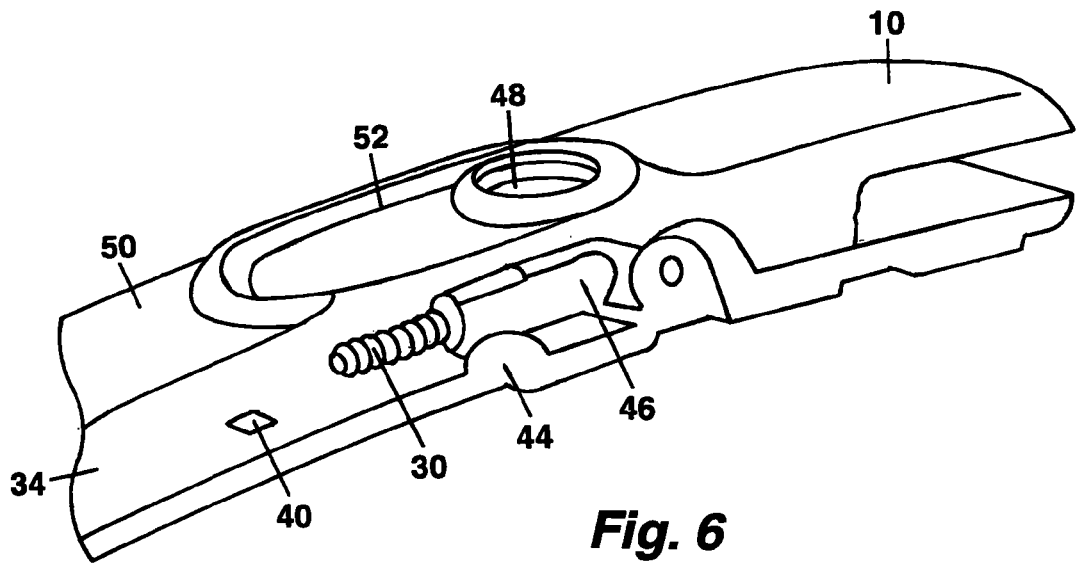
FIG. 6 is an additional detailed perspective view of a portion of FIGS. 3, 4, and 5.

At the end of the strap withdraw action, block 18 will have traveled to the position shown in FIG. 5 at which point extension 38 will fall into aperture 40 disposed in sidewall 42 of temple half 36. This may be facilitated by the inclusion of one or more ramps 44 on sidewall 42 at the position shown in FIGS. 3 and 6 which will assist in tilting the rear of block 18 upward as it moves toward the end of temple 10. Release of the block is accomplished by applying pressure to side 46 of the block opposite extension 38 through a depressible tab 48 disposed in sidewall 50 of temple half 34. Cutaway portion 52 between tab 48 and sidewall 50 is provided to allow the tab to move downward to engage block 18.

As variations in the above described preferred embodiment may be made within the general concept of the disclosure, the invention is accordingly defined by the following claims.

What is claimed is:

1. A retractable eyewear retaining strap assembly for an eyewear frame, said eyewear frame comprising a lens frame and first and second opposing temples, one each disposed on opposite sides of said lens frame, said retractable eyewear retaining strap assembly comprising in combination:
   A. a first temple having a strap receiving end and a lens frame attachable end hingeably attachable to said lens frame, said first temple having a longitudinal passageway extending the length of said first temple;
   B. a strap retaining block slideably mounted within said passageway;
   C. a strap retaining block retractor disposed within said passageway for biasing said strap retaining block toward said lens frame attachable end;
   D. an eyewear retaining strap disposed within said passageway attached to said strap retaining block, said strap withdrawable from said first temple at said strap receiving end;
   E. a first strap pivot positioned transverse said passageway proximate to said temple strap receiving end for receiving and reversing the direction of said strap;
   F. a second strap pivot attached to said strap retaining block for receiving and reversing the direction of said strap;
   G. lock and release means for securing said strap retaining block within said temple whereby said strap may be withdrawn from and secured outside of said first temple; and
   H. fastening means attached to said eyewear retaining strap, said fastening means attachable to said second opposing temple.

2. The retractable eyewear retaining strap assembly of claim 1 wherein said strap is elastic.

3. The retractable eyewear retaining strap assembly of claim 1 wherein said strap is inelastic.

4. The retractable eyewear retaining strap assembly of claim 1 wherein said first strap pivot comprises a bar.

5. The retractable eyewear retaining strap assembly of claim 1 wherein said second strap pivot comprises an aperture disposed in said strap retaining block.

6. The retractable eyewear retaining strap assembly of claim 1 wherein said strap retaining block retractor comprises in combination:
   A. a direction reversing retractor guide disposed in said temple proximate to said eyewear frame attachable end; and
   B. a strand of rubber material disposed in said temple passing around said guide, each end of said strand attached to said strap retaining block.

7. The eyewear assembly of claim 6 wherein said strand of rubber material comprises a rubber tube and said tube is attached to said strap retaining block by insertion into a pair of barbed shafts attached to said strap retaining block.

8. The eyewear assembly of claim 1 wherein said lock and release means comprises:
   A. an extension attached to said strap retaining block, said extension directed toward a first sidewall of said first temple;
   B. an aperture disposed in said first side wall for receiving said extension; and
   C. a depressible tab disposed in a second side wall of said first temple opposite said first side wall, said tab arranged to contact the surface of said strap retaining block opposite said extension,
   whereby, upon depressing said tab, said strap retaining block will rotate transverse said longitudinal passageway lifting said extension from said aperture.

\* \* \* \* \*